UNITED STATES PATENT OFFICE.

ARNOLD STEINER, OF BASEL, SWITZERLAND, ASSIGNOR TO CHEMISCHE FABRIK VORMALS SANDOZ, OF BASEL, SWITZERLAND.

PROCESS FOR THE MANUFACTURE OF COLORING-MATTERS DERIVED FROM GALLOCYANIN.

992,613.   Specification of Letters Patent.   Patented May 16, 1911.

No Drawing.   Application filed May 22, 1909. Serial No. 497,632.

*To all whom it may concern:*

Be it known that I, ARNOLD STEINER, of Chemische Fabrik vormals Sandoz, of Basel, Switzerland, have invented a new and useful Process for the Manufacture of Coloring-Matters Derived from Gallocyanin, of which the following is a specification.

The French patent of L. Durand Huguenin & Co., No. 231,316 of 4 July, 1893, (U. S. Patent No. 531,148, December 18, 1894, Bierer and de la Harpe) mentions that the phenols and their derivatives react with the gallocyanins in the presence of mineral acids to form leuco derivatives which by oxidation on the fiber give bluer shades than those obtained with the gallocyanins themselves.

I have now found that new products, different from the above mentioned bodies, are obtained upon operating in alkaline solution.

Among the phenolic derivatives which can be advantageously condensed with gallocyanin may be mentioned resorcin and its homologues, analogues and substitution products and certain naphthol sulfonic acids, for example the beta naphthol sulfonic acid of Schaeffer salt or R salt. The condensation of these bodies with gallocyanin is accompanied by partial reduction of this dyestuff.

In order to have a quantitative yield of the condensation products I introduce a suitable oxidizing agent during the reaction, for example by passing a current of air into the alkaline solution. This method of working likewise allows of starting with leucogallocyanin.

When the condensation is finished I heat the mass during one or two hours. The color bases obtained are not soluble or only slightly soluble in water, and in order to bring them into a suitable form for printing or dyeing it is necessary to reduce them. Chemically the dyestuffs obtained according to the invention may be regarded as derivatives of a pyrogallol gallocyanin, the carboxyl group of the gallocyanin being split off during the condensation in alkaline solution, whereas the leuco-derivatives of the French Patent No. 231,316 contain the carboxyl group probably in the shape of xanthone derivatives formed by elimination of a molecule of water between the carboxyl group of the gallocyanin and the molecule of resorcin.

The structural formula of the product of U. S. Patent No. 531,148 is probably:

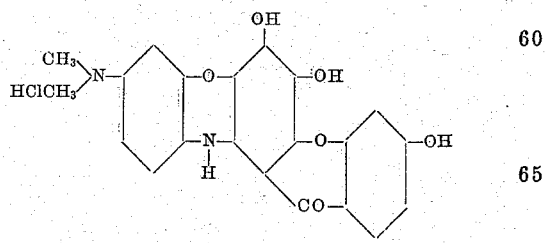

or

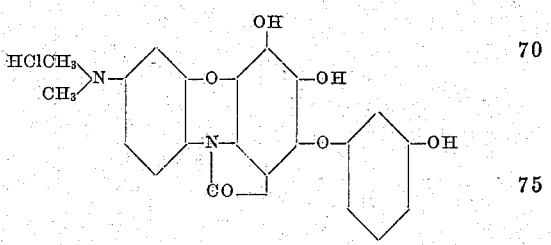

whereas the product of the present application is

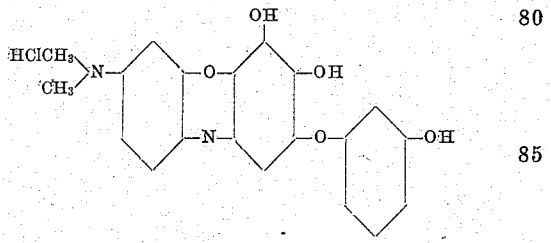

in case of the condensation of gallocyanin with resorcin.

The leuco derivatives of the new coloring matters are distinguished from the difficultly soluble product of the French Patent No. 231,316 by their high solubility in water, which greatly facilitates their employment in printing: moreover they yield on short steaming and without any subsequent oxidation, clear blue or violet shades on chromium mordants, whereas the leuco derivatives of the said French patent are difficult to fix and give grayish blue shades.

*Example I.*—34 parts of the gallocyanin from nitrosodimethylanilin and gallic acid are dissolved in 8 parts of caustic soda (2 molecules) and 500 parts of water. 25 to 34 parts of resorcin are then added and the whole is stirred for about three days at ordinary temperature in the presence of a current of air passed through the solution. The latter gradually thickens to a crystalline pasty mass which is finally heated to 90° C. filtered and washed. The dried condensation product is a crystalline powder with a bronze luster. It dissolves in concentrated sulfuric acid or concentrated hydrochloric acid with a pure blue color which on dilution with water changes to red-violet with gradual precipitation of a difficultly soluble sulfate or hydrochlorid. The body dissolves with a violet-blue color in a hot solution of excess carbonate of soda or caustic soda; it is difficultly soluble in alcohol with a blue color.

If in the above example the quantity of water is increased to twice or thrice the amount, and at the same time the duration of reaction is shortened, there is obtained as the main product of the reaction and besides the above described body, a soda-salt which crystallizes in small leaves. On heating the blue aqueous solution of this salt to 90° C., the above described condensation product separates in the form of a voluminous crystalline precipitate or in crystals having a brassy or coppery luster. The said soda salt which is an intermediate product, gives with hydrochloric acid a green insoluble hydrochlorid which, on reduction yields a difficultly soluble yellow crystalline leuco derivative, which appears to be identical with that obtained by condensation of gallocyanin with resorcin in accordance with French Patent No. 231,316.

*Example II—Gallocyanin and beta-naphtholsulfonic acids.*—To a solution of 67 parts of gallocyanin in 1000 parts of water and 80 parts of 20% caustic soda is added a slightly alkaline solution of 67 parts of sodium salt of Schaeffer's beta-naphthol 6 sulfonic acid, and the mixture is heated for some hours at 60–80° C. while passing a current of air therethrough. The blue solution obtained is poured into hot dilute hydrochloric acid. The condensation product separates in the form of a resinous substance having a coppery luster. The acid liquor is decanted and the residue is dissolved in ammonia. The dyestuff gives violet-blue shades on wool or chrome-mordanted cotton. In this example the Schaeffer naphtholsulfonic acid may be replaced by an isomeric or analogue acid, capable of being condensed with gallocyanin, for example by R salt, which yields a dyestuff of identical shade but more soluble.

The products of which the preparation is described in the above examples may also be obtained if carbonate of soda or ammonia is used in place of the caustic soda. Similar products are also obtained if ordinary gallocyanin is replaced by its bisulfite derivative or by the gallocyanins derived from gallic ether or from gallamic acid, these latter being probably converted in the presence of heat and in an alkaline medium into gallocyanins of gallic acid.

The new dyestuff obtainable according to the Example I is difficultly soluble in water; in order to bring it into a form suitable for dyeing or printing fabrics, it is necessary to convert it into its leuco derivatives, the hydrochlorids of which are readily soluble and are particularly suitable for printing cotton, on which they give, on short steaming, blue to violet shades, fast to washing.

The method of procedure may be as follows:—1 part of a product obtained according to Example I is suspended in 10 to 20 parts water to which 2–4 parts hydrochloric acid have been added. Zinc dust or other reducing agent capable of operating in acid solution is then slowly added, gently warming until solution occurs. The solution is filtered and salted out. The hydrochlorids of the leuco derivatives thus separate as thick oils very soluble in water; they can be dried *in vacuo* but it is simpler to use them in solution.

The reduction of the dyestuff can also be effected in an alkaline medium with the aid of sulfid of sodium or of hydrosulfites, or by means of electrolysis.

The leuco derivative corresponding to the product of Example I gives blue shades in printing.

What I claim and desire to secure by Letters Patent is:—

1. Process for the manufacture of dyestuffs, consisting in condensing gallocyanin with a phenolic derivative in alkaline solution.

2. Process for the manufacture of dyestuffs, consisting in condensing gallocyanin with a phenolic derivative of the naphthalene series, in alkaline solution.

3. Process for the manufacture of dyestuffs, consisting in condensing gallocyanin, in alkaline solution, with a naphthol sulfonic acid.

4. Process for the manufacture of a dyestuff consisting in condensing gallocyanin with Schaeffer salt, in alkaline solution.

5. Process for the manufacture of dyestuffs, consisting in treating gallocyanin in alkaline solution with a naphthol-sulfonic acid in presence of an air current.

6. Process for the manufacure of a dyestuff, consisting in treating gallocyanin in alkaline solution with Schaeffer salt in the presence of an air current.

7. Process for the manufacture of dyestuffs, consisting in treating gallocyanin in alkaline solution with a phenolic derivative in the cold and in presence of an air current, and heating the product obtained.

8. Process for the manufacture of dyestuffs, consisting in treating gallocyanin in alkaline solution with a phenolic derivative of the naphthalene series in the cold and in presence of an air current, and heating the product obtained.

9. The herein described new dyestuffs being condensation products of gallocyanin with a phenolic derivative in which condensation products the carboxyl group is split off, and forming crystalline powders, dissolving in strong sulfuric acid or hydrochloric acid with a blue color and yielding on chromium mordants pure blue to blue-violet shades fast to light and soaping.

In witness whereof, I have hereunto signed my name in the presence of two subscribing witnesses.

ARNOLD STEINER.

Witnesses:
GEORGE WAGNER,
CHARLES RYHINER.

---

Copies of this patent may be obtained for five cents each, by addressing the "Commissioner of Patents, Washington, D. C."